(12) United States Patent
Ji et al.

(10) Patent No.: US 9,829,078 B2
(45) Date of Patent: Nov. 28, 2017

(54) PLANETARY GEAR TRAIN OF AUTOMATIC TRANSMISSION FOR VEHICLE

(71) Applicant: Hyundai Motor Company, Seoul (KR)

(72) Inventors: Seongwook Ji, Gunpo-si (KR); Seong Wook Hwang, Gunpo-si (KR); Woo Jin Chang, Suwon-si (KR); Wonmin Cho, Hwaseong-si (KR); Hyun Sik Kwon, Seoul (KR); Jae Chang Kook, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/267,507

(22) Filed: Sep. 16, 2016

(65) Prior Publication Data

US 2017/0268627 A1    Sep. 21, 2017

(30) Foreign Application Priority Data

Mar. 18, 2016 (KR) .................. 10-2016-0032991

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01); *F16H 2200/2097* (2013.01)

(58) Field of Classification Search
CPC .............. F16H 3/66; F16H 2200/0069; F16H 2200/2012; F16H 2200/2046; F16H 2200/2097

See application file for complete search history.

(56) References Cited

U.S. PATENT DOCUMENTS

| | | | |
|---|---|---|---|
| 8,025,602 B2 | 9/2011 | Phillips et al. | |
| 2008/0280722 A1* | 11/2008 | Phillips ..................... | F16H 3/66 475/276 |
| 2008/0280724 A1* | 11/2008 | Phillips ..................... | F16H 3/66 475/276 |
| 2013/0260945 A1* | 10/2013 | Fellmann .................. | F16H 3/66 475/275 |

* cited by examiner

*Primary Examiner* — Huan Le
(74) *Attorney, Agent, or Firm* — Morgan, Lewis & Bockius LLP

(57) ABSTRACT

A planetary gear train of an automatic transmission for a vehicle may an input shaft receiving torque of an engine, an output shaft outputting torque of the input shaft, a first planetary gear set, a second planetary gear set, a third planetary gear set, a fourth planetary gear set, a first shaft, a second shaft directly connected to the input shaft, a third shaft directly connected to the output shaft, a fourth shaft, a fifth shaft, a sixth shaft selectively connectable to the first shaft, a seventh shaft selectively connectable to at least one of the first shaft and the fourth shaft, an eighth shaft selectively connectable to at least one of the fifth shaft and the sixth shaft, and a ninth shaft directly connected to a transmission housing.

11 Claims, 2 Drawing Sheets

FIG. 2

| Speed stage | Control element | | | | | | Gear ratio |
|---|---|---|---|---|---|---|---|
| | C1 | C2 | C3 | C4 | C5 | B1 | |
| D1 |  |  | ● |  | ● | ● | 4.333 |
| D2 |  |  | ● | ● | ● |  | 2.600 |
| D3 |  | ● | ● |  | ● |  | 1.976 |
| D4 |  | ● |  | ● | ● |  | 1.615 |
| D5 |  | ● | ● | ● |  |  | 1.494 |
| D6 | ● |  | ● | ● |  |  | 1.242 |
| D7 | ● | ● | ● |  |  |  | 1.000 |
| D8 | ● |  | ● |  |  | ● | 0.800 |
| D9 |  | ● | ● |  |  | ● | 0.615 |
| D10 | ● | ● |  |  |  | ● | 0.533 |
| REV |  |  | ● | ● |  | ● | -6.500 |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2016-0032991 filed Mar. 18, 2016, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle that may improve power delivery performance and reduce fuel consumption by achieving at least ten forward speed stages using a minimum number of constituent elements, and may improve silent driving by using a driving point positioned at a low engine speed.

Description of Related Art

Recently, increasing oil prices have caused vehicle manufactures all over the word to rush into infinite competition. Particularly in the case of engines, manufactures have been pursuing efforts to reduce the weight and improve fuel efficiency of vehicles by reducing engine size, etc.

As a result, research into reduction of weight and enhancement of fuel efficiency through downsizing has been conducted in the case of an engine and research for simultaneously securing operability and fuel efficiency competitiveness through multiple speed stages has been conducted in the case of an automatic transmission.

However, in the automatic transmission, as the number of speed stages increases, the number of internal components also increases, and as a result, the automatic transmission may be difficult to mount, the manufacturing cost and weight may be increased, and power transmission efficiency may be deteriorated.

Accordingly, development of a planetary gear train which may bring about maximum efficiency with a small number of components is important in order to increase a fuel efficiency enhancement effect through the multiple speed stages.

In this aspect, in recent years, 8-speed automatic transmission tends to be implemented and the research and development of a planetary gear train capable of implementing more speed stages has also been actively conducted.

A conventional automatic transmission of eight or more speed stages typically includes three or four planetary gear sets and five or six control elements (frictional elements), and thus mountability may be deteriorated due to increase of volume and weight.

In this regard, disposing planetary gear sets in parallel or employing dog clutches instead of wet-type control elements has been attempted. However, such an arrangement is not widely applicable, and using the dog clutches may deteriorate shift-feel.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle that improves power delivery performance and fuel efficiency by achieving at least ten forward speed stages and at least one reverse speed stage using a minimum number of constituent elements, and improves silent driving by using a driving point positioned at a low engine speed.

According to various aspects of the present invention, a planetary gear train of an automatic transmission for a vehicle may include an input shaft receiving torque of an engine, an output shaft outputting torque of the input shaft, a first planetary gear set including a first rotation element, a second rotation element, and a third rotation element, a second planetary gear set including a fourth rotation element, a fifth rotation element, and a sixth rotation element, a third planetary gear set including a seventh rotation element, an eighth rotation element, and a ninth rotation element, a fourth planetary gear set including a tenth rotation element, an eleventh rotation element, and a twelfth rotation element, a first shaft connected to the first rotation element, a second shaft connecting the second rotation element to the fourth rotation element and directly connected to the input shaft, a third shaft connecting the third rotation element to the eleventh rotation element and directly connected to the output shaft, a fourth shaft connected to the fifth rotation element, a fifth shaft connecting the sixth rotation element to the ninth rotation element, a sixth shaft connected to the seventh rotation element and selectively connectable to the first shaft, a seventh shaft connected to the eighth rotation element and selectively connectable to at least one of the first shaft and the fourth shaft, an eighth shaft connected to the tenth rotation element and selectively connectable to at least one of the fifth shaft and the sixth shaft, and a ninth shaft connected to the twelfth rotation element and directly connected to a transmission housing.

The fourth shaft may be selectively connectable to the transmission housing.

The first rotation element, the second rotation element, and the third rotation element may be a first sun gear, a first planet carrier, and a first ring gear, the fourth rotation element, the fifth rotation element, and the sixth rotation element may be a second sun gear, a second planet carrier, and a second ring gear, the seventh rotation element, the eighth rotation element, and the ninth rotation element may be a third sun gear, a third planet carrier, and a third ring gear, and the tenth rotation element, the eleventh rotation element, and the twelfth rotation element may be a fourth sun gear, a fourth planet carrier, and a fourth ring gear.

Each of the first, second, third, and fourth planetary gear sets may be a single pinion planetary gear set.

The planetary gear train may further include a first clutch disposed between the first shaft and the sixth shaft, a second clutch disposed between the first shaft and the seventh shaft, a third clutch disposed between the fourth shaft and the seventh shaft, a fourth clutch disposed between the fifth shaft and the eighth shaft, a fifth clutch disposed between the sixth shaft and the eighth shaft, and a first brake disposed between the fourth shaft and the transmission housing.

The third and fifth clutches and the first brake may be operated at a first forward speed stage, the third, fourth, and fifth clutches may be operated at a second forward speed stage, the second, third, and fifth clutches may be operated at a third forward speed stage, the second, fourth, and fifth clutches may be operated at a fourth forward speed stage, the second, third, and fourth clutches may be operated at fifth forward speed stage, the first, third, and fourth clutches may be operated at a sixth forward speed stage, the first, second, and third clutches may be operated at a seventh forward speed stage, the first and third clutches and the first brake may be operated at a eighth forward speed stage, the second and third clutches and the first brake may be operated at a ninth forward speed stage, the first and second clutches and the first brake may be operated at a tenth forward speed stage, and the third and fourth clutches and the first brake may be operated at a reverse speed stage.

According to various aspects of the present invention, a planetary gear train of an automatic transmission for a vehicle may include an input shaft receiving torque of an engine, an output shaft outputting torque of the input shaft, a first planetary gear set including a first rotation element, a second rotation element, and a third rotation element, a second planetary gear set including a fourth rotation element, a fifth rotation element, and a sixth rotation element, a third planetary gear set including a seventh rotation element, an eighth rotation element, and a ninth rotation element, and a fourth planetary gear set including a tenth rotation element, an eleventh rotation element, and a twelfth rotation element, in which the input shaft may be directly connected to the second rotation element, the output shaft may be directly connected to the third rotation element, the second rotation element may be directly connected to the fourth rotation element, the third rotation element may be directly connected to the eleventh rotation element, the sixth rotation element may be directly connected to the ninth rotation element, the seventh rotation element selectively connectable to the first rotation element, the eighth rotation element may be selectively connectable to at least one of the first rotation element and the fifth rotation element, the tenth rotation element may be selectively connectable to at least one of the seventh rotation element and the ninth rotation element, the fifth rotation element may be selectively connectable to a transmission housing, and the twelfth rotation element may be directly connected to the transmission housing.

The planetary gear train may further include a first clutch selectively connecting the first rotation element to the seventh rotation element, a second clutch selectively connecting the first rotation element to the eighth rotation element, a third clutch selectively connecting the fifth rotation element to the eighth rotation element, a fourth clutch selectively connecting the ninth rotation element to the tenth rotation element, a fifth clutch selectively connecting the seventh rotation element to the tenth rotation element, and a first brake selectively connecting the fifth rotation element to the transmission housing.

Various embodiments of the present invention achieve at least ten forward speed stages and at least one reverse speed stage by combining four planetary gear sets with six control elements.

Since a speed stage suitable to an engine speed is achieved due to multiple speed stages and a driving point positioned at a low engine speed may be used, silent driving is improved.

In addition, engine driving efficiency is maximized by achieving multiple speed stages, and power delivery performance and fuel efficiency are improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of control elements at each speed stage in the planetary gear train according to various embodiments of the present invention.

Figure 1:
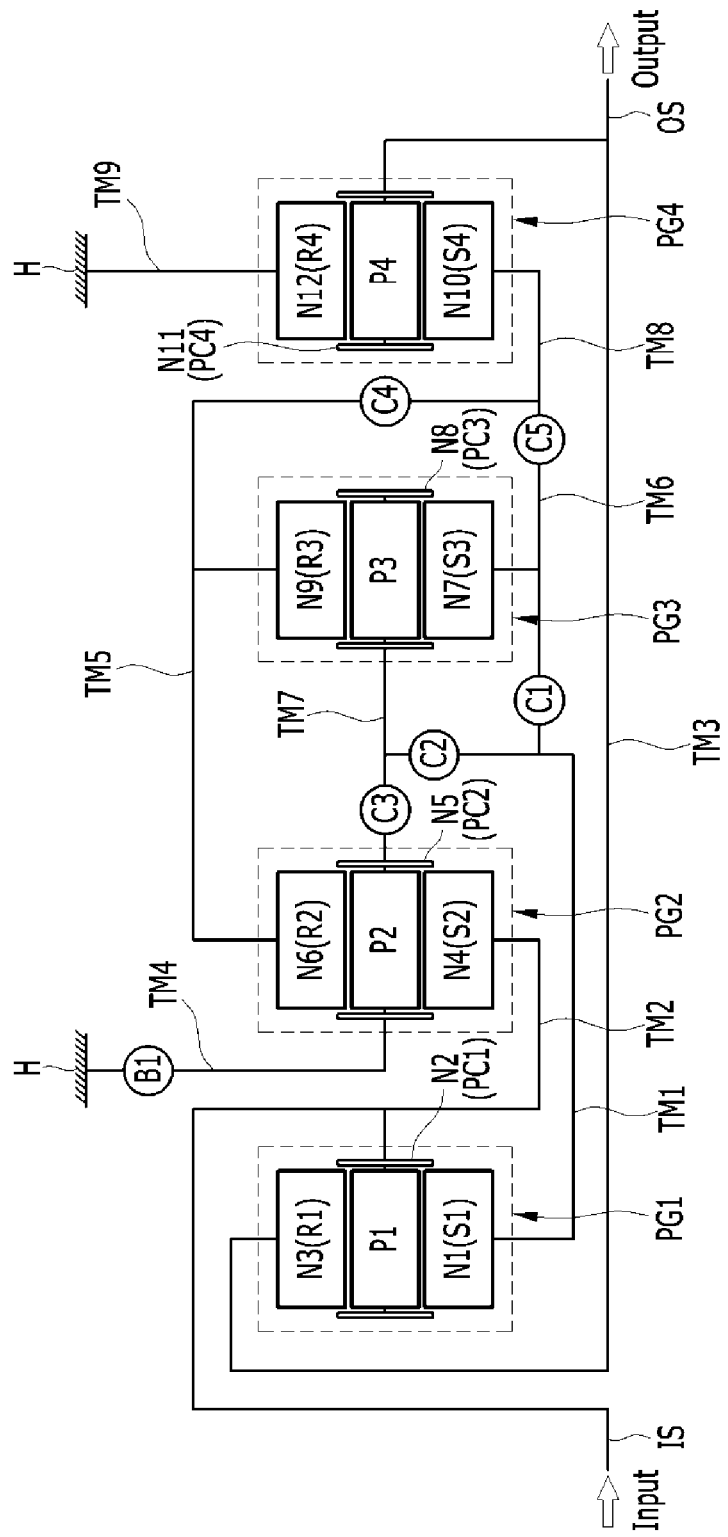
FIG. 1 is a schematic diagram of a planetary gear train according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention.

Referring to FIG. 1, a planetary gear train according to various embodiments of the present invention includes first, second, third, and fourth planetary gear sets PG1, PG2, PG3, and PG4 disposed on the same axis, an input shaft IS, an output shaft OS, nine shafts TM1 to TM9 connected to at least one of rotation elements of the first, second, third, and fourth planetary gear sets PG1, PG2, PG3, and PG4, five control elements C1 to C5 and B1, and a transmission housing H.

Torque of an engine input from the input shaft IS is changed by cooperation of the first, second, third, and fourth planetary gear sets PG1, PG2, PG3, and PG4, and the changed torque is output through the output shaft OS.

The planetary gear sets PG1, PG2, PG3, and PG4 are disposed sequentially from an engine side.

The input shaft IS is an input member and power from a crankshaft of the engine is torque-converted through a torque converter to be input to the input shaft IS.

The output shaft OS is an output member, is disposed in parallel with the input shaft IS, and transmit driving torque to a driving wheel through a differential apparatus.

The first planetary gear set PG1 is a single pinion planetary gear set and includes a first sun gear S1, a first planet carrier PC1 rotatably supporting a first pinion gear P1 externally meshed with the first sun gear S1, and a first ring gear R1 internally meshed with the first pinion gear P1 respectively as first, second, and third rotation elements N1, N2, and N3.

The second planetary gear set PG2 is a single pinion planetary gear set and includes a second sun gear S2, a second planet carrier PC2 rotatably supporting a second pinion gear P2 externally meshed with the second sun gear S2, and a second ring gear R2 internally meshed with the second pinion gear P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion gear P3 externally meshed with the third sun gear S3, and a third ring gear R3 internally meshed with the third pinion gear P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion gear P4 externally meshed with the fourth sun gear S4, and a fourth ring gear R4 internally meshed with the fourth pinion gear P4 respectively as tenth, eleventh, and twelfth rotation elements N10, N11, and N11.

The second rotation element N2 is directly connected to the fourth rotation element N4, the third rotation element N3 is directly connected to the eleventh rotation element N11, the sixth rotation element N6 is directly connected to the ninth rotation element N9, and the first, second, third, and fourth planetary gear sets PG1, PG2, PG3, and PG4 are operated with nine shafts TM1 to TM9.

The nine shafts TM1 to TM9 will be described in further detail.

Each of nine shafts TM1 to TM9 may directly connect at least one rotation element to another rotation element, may be a rotational member rotating with at least one rotation element, or may be a fixed member fixed to the transmission housing H.

The first shaft TM1 is connected to the first sun gear S1.

The second shaft TM2 connects the first planet carrier PC1 to the second sun gear S2 and is directly connected to the input shaft IS to be continuously operated as an input element.

The third shaft TM3 connects the first ring gear R1 to the fourth planet carrier PC4 and is directly connected to the output shaft OS to be continuously operated as an output element.

The fourth shaft TM4 is connected to the second planet carrier PC2 and is selectively connectable to the transmission housing H to be operated as a selective fixed element.

The fifth shaft TM5 connects the second ring gear R2 to the third ring gear R3.

The sixth shaft TM6 is connected to the third sun gear S3 and is selectively connectable to the first shaft TM1.

The seventh shaft TM7 is connected to the third planet carrier PC3 and is selectively connectable to the first shaft TM1 or the fourth shaft TM4.

The eighth shaft TM8 is connected to the fourth sun gear S4 and is selectively connectable to the fifth shaft TM5 or the sixth shaft TM6.

The ninth shaft TM9 is connected to the fourth ring gear R4 and directly connected to the transmission housing H to be continuously operated as a fixed element.

In addition, five clutches C1, C2, C3, C4, and C5 which are control elements are disposed at connection portions between any two shafts among the shafts TM1 to TM9.

In addition, one brake B1 which is a control element is disposed at a connection portion between any one shaft among the shafts TM1 to TM9 and the transmission housing H.

The six control elements C1 to C5 and B1 will be described in further detail.

The first clutch C1 is disposed between the first shaft TM1 and the sixth shaft TM6 and selectively causes the first shaft TM1 and the sixth shaft TM6 to integrally rotate with each other.

The second clutch C2 is disposed between the first shaft TM1 and the seventh shaft TM7 and selectively causes the first shaft TM1 and the seventh shaft TM7 to integrally rotate with each other.

The third clutch C3 is disposed between the fourth shaft TM4 and the seventh shaft TM7 and selectively causes the fourth shaft TM4 and the seventh shaft TM7 to integrally rotate each other.

The fourth clutch C4 is disposed between the fifth shaft TM5 and the eighth shaft TM8 and selectively causes the fifth shaft TM5 and the eighth shaft TM8 to integrally rotate with each other.

The fifth clutch C5 is disposed between the sixth shaft TM6 and the eighth shaft TM8 and selectively causes the sixth shaft TM6 and the eighth shaft TM8 to integrally rotate with each other.

The first brake B1 is disposed between the fourth shaft TM4 and the transmission housing H and causes the fourth shaft TM4 to be operated as a selective fixed element.

The control elements including the first, second, third, fourth, and fifth clutches C1, C2, C3, C4, and C5 and the first brake B1 may be multi-plates friction elements of wet type that are operated by hydraulic pressure.

FIG. 2 is an operation chart of control elements at each speed stage in the planetary gear train according to various embodiments of the present invention.

Referring to FIG. 2, three control elements are operated at each speed stage in the planetary gear train according to various embodiments of the present invention. Shifting processes in the various embodiments of the present invention will be described in further detail.

The third and fifth clutches C3 and C5 and the first brake B1 are operated at a first forward speed stage D1.

In a state that the fourth shaft TM4 is connected to the seventh shaft TM7 by operation of the third clutch C3 and the sixth shaft TM6 is connected to the eighth shaft TM8 by operation of the fifth clutch C5, torque of the input shaft IS is input to the second shaft TM2. In addition, in a state that the ninth shaft TM9 is continuously operated as the fixed element, the fourth shaft TM4 is operated as the fixed element by operation of the first brake B1. Therefore, the first forward speed stage D1 is achieved and torque of the input shaft IS is output through the output shaft OS connected to the third shaft TM3.

The third, fourth, and fifth clutches C3, C4, and C5 are operated at a second forward speed stage D2.

In a state that the fourth shaft TM4 is connected to the seventh shaft TM7 by operation of the third clutch C3, the fifth shaft TM5 is connected to the eighth shaft TM8 by operation of the fourth clutch C4, and the sixth shaft TM6 is connected to the eighth shaft TM8 by operation of the fifth clutch C5, the torque of the input shaft IS is input to the second shaft TM2. In addition, the ninth shaft TM9 is continuously operated as the fixed element. Therefore, the second forward speed stage D2 is achieved and the torque of the input shaft IS is output through the output shaft OS connected to the third shaft TM3.

The second, third, and fifth clutches C2, C3, and C5 are operated at a third forward speed stage D3.

In a state that the first shaft TM1 is connected to the seventh shaft TM7 by operation of the second clutch C2, the fourth shaft TM4 is connected to the seventh shaft TM7 by operation of the third clutch C3, and the sixth shaft TM6 is connected to the TM8 by operation of the fifth clutch C5, the torque of the input shaft IS is input to the second shaft TM2. In addition the ninth shaft TM9 is continuously operated as the fixed element. Therefore, the third forward speed stage D3 is achieved and the torque of the input shaft IS is output through the output shaft OS connected to the third shaft TM3.

The second, fourth, and fifth clutches C2, C4, and C5 are operated at a fourth forward speed stage D4.

In a state that the first shaft TM1 is connected to the seventh shaft TM7 by operation of the second clutch C2, the fifth shaft TM5 is connected to the eighth shaft TM8 by operation of the fourth clutch C4, and the sixth shaft TM6 is connected to the eighth shaft TM8 by operation of the fifth clutch C5, the torque of the input shaft IS is input to the second shaft TM2. In addition, the ninth shaft TM9 is continuously operated as the fixed element. Therefore, the fourth forward speed stage D4 is achieved and the torque of the input shaft IS is output through the output shaft OS connected to the third shaft TM3.

The second, third, and fourth clutches C2, C3, and C4 are operated at a fifth forward speed stage D5.

In a state that the first shaft TM1 is connected to the seventh shaft TM7 by operation of the second clutch C2, the fourth shaft TM4 is connected to the seventh shaft TM7 by operation of the third clutch C3, and the fifth shaft TM5 is connected to the eighth shaft TM8 by operation of the fourth clutch C4, the torque of the input shaft IS is input to the second shaft TM2. In addition, the ninth shaft TM9 is continuously operated as the fixed element. Therefore, the fifth forward speed stage D5 is achieved and the torque of the input shaft IS is output through the output shaft OS connected to the third shaft TM3.

The first, third, and fourth clutches C1, C3, and C4 are operated at a sixth forward speed stage.

In a state that the first shaft TM1 is connected to the sixth shaft TM6 by operation of the first clutch C1, the fourth shaft TM4 is connected to the seventh shaft TM7 by operation of the third clutch C3, and the fifth shaft TM5 is connected to the eighth shaft TM8 by operation of the fourth clutch C4, the torque of the input shaft IS is input to the second shaft TM2. In addition, the ninth shaft TM9 is continuously operated as the fixed element. Therefore, the sixth forward speed stage D6 is achieved and the torque of the input shaft IS is output through the output shaft OS connected to the third shaft TM3.

The first, second, and third clutches C1, C2, and C3 are operated at a seventh forward speed stage D7.

In a state that the first shaft TM1 is connected to the sixth shaft TM6 by operation of the first clutch C1, the first shaft TM1 is connected to the seventh shaft TM7 by operation of the second clutch C2, and the fourth shaft TM4 is connected to the seventh shaft TM7 by operation of the third clutch C3, the torque of the input shaft IS is input to the second shaft TM2. In addition, the ninth shaft TM9 is continuously operated as the fixed element. Therefore, the seventh forward speed stage D7 is achieved and the torque of the input shaft IS is output through the output shaft OS connected to the third shaft TM3.

The first and third clutches C1 and C3 and the first brake B1 are operated at an eighth forward speed stage D8.

In a state that the first shaft TM1 is connected to the sixth shaft TM6 by operation of the first clutch C1 and the fourth shaft TM4 is connected to the seventh shaft TM7 by operation of the third clutch C3, the torque of the input shaft IS is input to the second shaft TM2. In addition, in a state that the ninth shaft TM9 is continuously operated as the fixed element, the fourth shaft TM4 is operated as the fixed element by operation of the first brake B1. Therefore, the eighth forward speed stage D8 is achieved and the torque of the input shaft IS is output through the output shaft OS connected to the third shaft TM3.

The second and third clutches C2 and C3 and the first brake B1 are operated a ninth forward speed stage D9.

In a state that the first shaft TM1 is connected to the seventh shaft TM7 by operation of the second clutch C2 and the fourth shaft TM4 is connected to the seventh shaft TM7 by operation of the third clutch C3, the torque of the input shaft IS is input to the second shaft TM2. In addition, in a state that the ninth shaft TM9 is continuously operated as the fixed element, the fourth shaft TM4 is operated as the fixed element by operation of the first brake B1. Therefore, the ninth forward speed stage D9 is achieved and the torque of the input shaft IS is output through the output shaft OS connected to the third shaft TM3.

The first and second clutches C1 and C2 and the first brake B1 are operated at a tenth forward speed stage D10.

In a state that the first shaft TM1 is connected to the sixth shaft TM6 by operation of the first clutch C1 and the first shaft TM1 is connected to the seventh shaft TM7 by operation of the second clutch C2, the torque of the input shaft IS is input to the second shaft TM2. In addition, in a state that the ninth shaft TM9 is continuously operated as the fixed element, the fourth shaft TM4 is operated as the fixed element by operation of the first brake B1. Therefore, the tenth forward speed stage D10 is achieved and the torque of the input shaft IS is output through the output shaft OS connected to the third shaft TM3.

The third and fourth clutches C3 and C4 and the first brake B1 are operated at a reverse speed stage REV.

In a state that the fourth shaft TM4 is connected to the seventh shaft TM7 by operation of the third clutch C3 and the fifth shaft TM5 is connected to the eighth shaft TM8 by operation of the fourth clutch C4, the torque of the input shaft IS is input to the second shaft TM2. In addition, in a state that the ninth shaft TM9 is continuously operated as the fixed element, the fourth shaft TM4 is operated as the fixed element by operation of the first brake B1. Therefore, the reverse speed stage REV is achieved and the torque of the input shaft IS is output through the output shaft OS connected to the third shaft TM3.

The planetary gear train according to various embodiments of the present invention achieves at least ten forward speed stages and at least one reverse speed stage by control of the four planetary gear sets PG1, PG2, PG3, and PG4, five clutches C1, C2, C3, C4, and C5, and one brake B1.

Since a speed stage suitable to an engine speed is achieved due to multiple speed stages and a driving point positioned at a low engine speed is used, silent driving is improved.

In addition, engine driving efficiency is maximized by achieving multiple speed stages, and power delivery performance and fuel efficiency is improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
an input shaft receiving torque of an engine;
an output shaft outputting torque of the input shaft;
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element;
a fourth planetary gear set including a tenth rotation element, an eleventh rotation element, and a twelfth rotation element;
a first shaft connected to the first rotation element;
a second shaft connecting the second rotation element to the fourth rotation element and directly connected to the input shaft;
a third shaft connecting the third rotation element to the eleventh rotation element and directly connected to the output shaft;
a fourth shaft connected to the fifth rotation element;
a fifth shaft connecting the sixth rotation element to the ninth rotation element;
a sixth shaft connected to the seventh rotation element and selectively connectable to the first shaft;
a seventh shaft connected to the eighth rotation element and selectively connectable to at least one of the first shaft and the fourth shaft;
an eighth shaft connected to the tenth rotation element and selectively connectable to at least one of the fifth shaft and the sixth shaft; and
a ninth shaft connected to the twelfth rotation element and directly connected to a transmission housing.

2. The planetary gear train of claim 1, wherein the fourth shaft is selectively connectable to the transmission housing.

3. The planetary gear train of claim 1, wherein the first rotation element, the second rotation element, and the third rotation element of the first planetary gear set comprise a first sun gear, a first planet carrier, and a first ring gear, respectively,
the fourth rotation element, the fifth rotation element, and the sixth rotation element of the second planetary gear set comprise a second sun gear, a second planet carrier, and a second ring gear, respectively,
the seventh rotation element, the eighth rotation element, and the ninth rotation element of the third planetary gear set comprise a third sun gear, a third planet carrier, and a third ring gear, respectively, and
the tenth rotation element, the eleventh rotation element, and the twelfth rotation element of the fourth planetary gear set comprise a fourth sun gear, a fourth planet carrier, and a fourth ring gear, respectively.

4. The planetary gear train of claim 1, wherein each of the first, second, third, and fourth planetary gear sets comprises a single pinion planetary gear set.

5. The planetary gear train of claim 1, further comprising:
a first clutch disposed between the first shaft and the sixth shaft;
a second clutch disposed between the first shaft and the seventh shaft;
a third clutch disposed between the fourth shaft and the seventh shaft;
a fourth clutch disposed between the fifth shaft and the eighth shaft;
a fifth clutch disposed between the sixth shaft and the eighth shaft; and
a first brake disposed between the fourth shaft and the transmission housing.

6. The planetary gear train of claim 5, wherein
the third and fifth clutches and the first brake are operated at a first forward speed;
the third, fourth, and fifth clutches are operated at a second forward speed;
the second, third, and fifth clutches are operated at a third forward speed;
the second, fourth, and fifth clutches are operated at a fourth forward speed;
the second, third, and fourth clutches are operated at fifth forward speed;
the first, third, and fourth clutches are operated at a sixth forward speed;
the first, second, and third clutches are operated at a seventh forward speed;
the first and third clutches and the first brake are operated at a eighth forward speed;
the second and third clutches and the first brake are operated at a ninth forward speed;
the first clutch and the second clutch and the first brake are operated at a tenth forward speed; and
the third and fourth clutches and the first brake are operated at a reverse speed stage.

7. A planetary gear train of an automatic transmission for a vehicle, comprising:
an input shaft receiving torque of an engine;
an output shaft outputting torque of the input shaft;
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element; and
a fourth planetary gear set including a tenth rotation element, an eleventh rotation element, and a twelfth rotation element,
wherein the input shaft is directly connected to the second rotation element,
the output shaft is directly connected to the third rotation element,
the second rotation element is directly connected to the fourth rotation element,
the third rotation element is directly connected to the eleventh rotation element,
the sixth rotation element is directly connected to the ninth rotation element,
the seventh rotation element selectively connectable to the first rotation element,
the eighth rotation element is selectively connectable to at least one of the first rotation element and the fifth rotation element, the tenth rotation element is selectively connectable to at least one of the seventh rotation element and the ninth rotation element, the fifth rotation element is selectively connectable to a transmission housing, and the twelfth rotation element is directly connected to the transmission housing.

8. The planetary gear train of claim 7, wherein the first rotation element, the second rotation element, and the third rotation element of the first planetary gear set comprise a first sun gear, a first planet carrier, and a first ring gear, respectively, the fourth rotation element, the fifth rotation element, and the sixth rotation element of the second planetary gear set comprise a second sun gear, a second planet carrier, and a second ring gear, respectively, the seventh rotation element, the eighth rotation element, and the ninth rotation element of the third planetary gear set comprise a third sun gear, a third planet carrier, and a third ring gear, respectively, and the tenth rotation element, the eleventh rotation element, and the twelfth rotation element of the fourth planetary gear set comprise a fourth sun gear, a fourth planet carrier, and a fourth ring gear, respectively.

9. The planetary gear train of claim 8, wherein each of the first, second, third, and fourth planetary gear sets comprises a single pinion planetary gear set.

10. The planetary gear train of claim 7, further comprising:

a first clutch selectively connecting the first rotation element to the seventh rotation element;

a second clutch selectively connecting the first rotation element to the eighth rotation element;

a third clutch selectively connecting the fifth rotation element to the eighth rotation element;

a fourth clutch selectively connecting the ninth rotation element to the tenth rotation element;

a fifth clutch selectively connecting the seventh rotation element to the tenth rotation element; and a first brake selectively connecting the fifth rotation element to the transmission housing.

11. The planetary gear train of claim 10, wherein the third and fifth clutches and the first brake are operated at a first forward speed;

the third, fourth, and fifth clutches are operated at a second forward speed;

the second, third, and fifth clutches are operated at a third forward speed;

the second, fourth, and fifth clutches are operated at a fourth forward speed;

the second, third, and fourth clutches are operated at fifth forward speed;

the first, third, and fourth clutches are operated at a sixth forward speed;

the first, second, and third clutches are operated at a seventh forward speed;

the first and third clutches and the first brake are operated at a eighth forward speed;

the second and third clutches and the first brake are operated at a ninth forward speed;

the first clutch and the second clutch and the first brake are operated at a tenth forward speed; and the third and fourth clutches and the first brake are operated at a reverse speed stage.

* * * * *